United States Patent [19]

Bach

[11] 4,239,447
[45] Dec. 16, 1980

[54] ARMORED MONEY-DELIVERING VEHICLE

[76] Inventor: Bert Bach, 270 West End Ave., New York, N.Y. 10023

[21] Appl. No.: 903,520

[22] Filed: May 8, 1978

Related U.S. Application Data

[63] Continuation of Ser. No. 796,733, May 13, 1977, abandoned.

[51] Int. Cl.³ .............................................. F41H 7/00
[52] U.S. Cl. .................................... 414/786; 180/313; 296/1 A; 414/537
[58] Field of Search ............... 414/786, 537, 538, 498, 414/495; 296/1 A; 180/313

[56] References Cited

U.S. PATENT DOCUMENTS

| 2,541,288 | 2/1951 | Rice | 414/537 |
|---|---|---|---|
| 3,497,093 | 2/1970 | Mardiat, Sr. | 414/498 |
| 4,183,708 | 1/1980 | Kuhbier | 414/498 X |

Primary Examiner—Stephen G. Kunin
Assistant Examiner—Terrance L. Siemens
Attorney, Agent, or Firm—Walter Spruegel

[57] ABSTRACT

An armored satellite truck is normally carried by an armored main truck and lowered onto the ground outside a bank establishment for delivering money and/or other valuables from the main truck to the interior of the establishment by an armed driver in the protected interior of the satellite truck.

1 Claim, 6 Drawing Figures

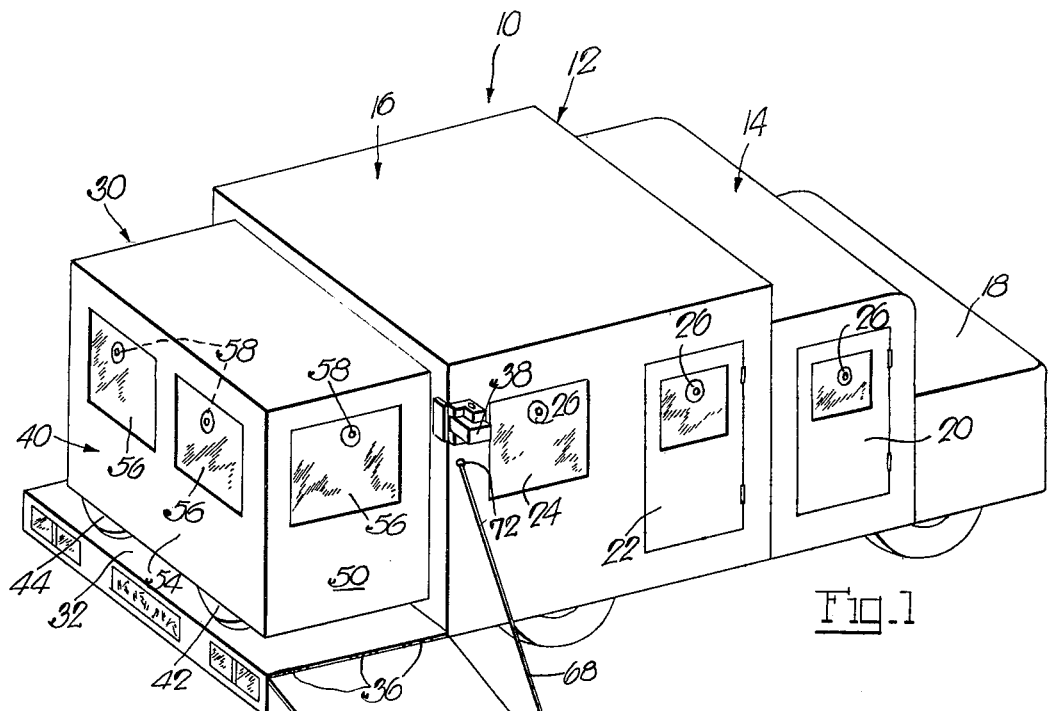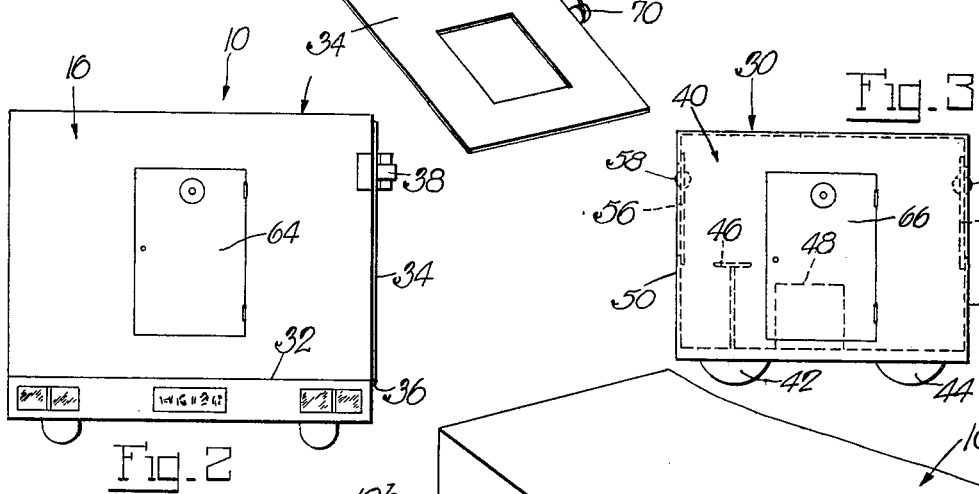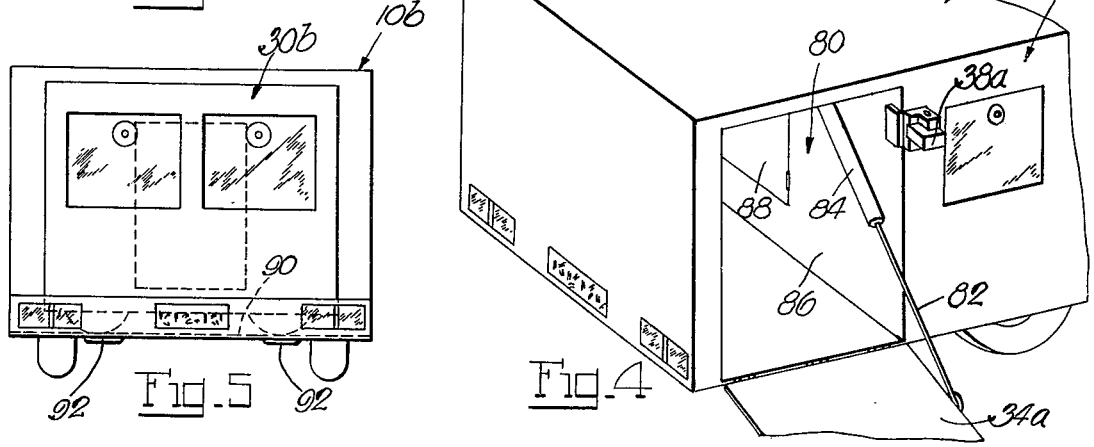

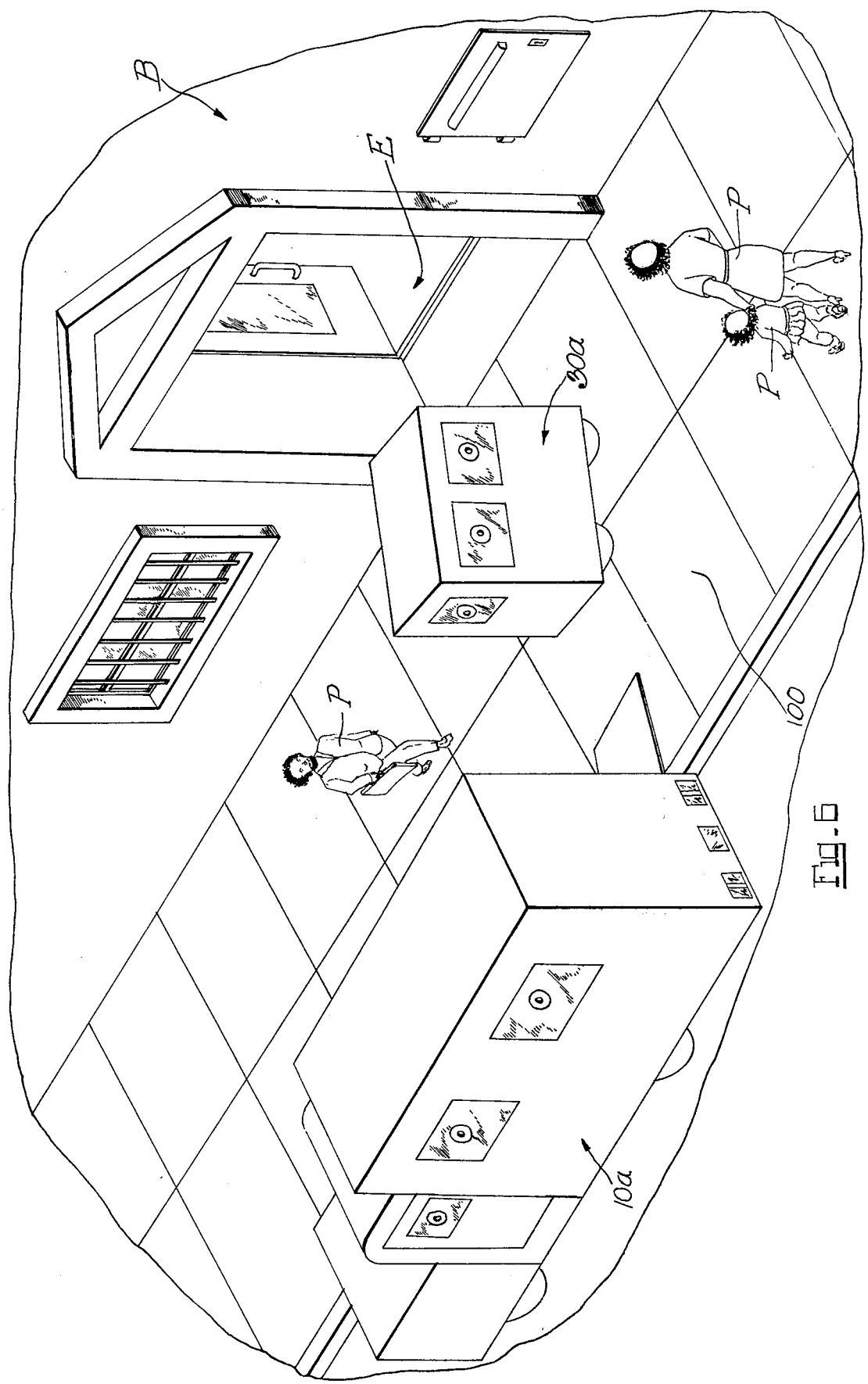

_4,239,447_

ARMORED MONEY-DELIVERING VEHICLE

CROSS REFERENCE TO RELATED APPLICATION

This application is a continuation of my copending application Ser. No. 796,733, filed May 13, 1977, now abandoned.

SUMMARY OF THE INVENTION

This invention relates to armored vehicles, and more particularly to armored trucks for safe transport and delivery of money and/or other valuables to business establishments such as banks.

Such valuables, mostly money, are usually transported in armored trucks to various banks and are there delivered inside the banks by customarily armed guards assigned to the trucks. However, while the transport of money to various banks in armored trucks is in most cases safe and reliable, the delivery of such money to the inside of the banks by the guards on these trucks is not so reliable because statistics show that almost all hold-ups involving armored trucks occur in the course of money delivery to the inside of banks by truck guards and not en route of trucks to banks.

The patent to Mardiat U.S. Pat. No. 3,497,093 shows a prior attempt to cope with such hold-ups, by providing an armored truck with a built-in vault for reception of a wheeled money-holding safe, and with an elevator operable to open the vault to the outside for wheeling the safe onto the raised elevator, and then lower the elevator to ground level from where to wheel the safe to the inside of the bank. However, this mode of money delivery is neither safer for the truck guards, nor less conducive to hold-ups, than the accustomed hand delivery of money bags by the guards. Thus, in either case, guards must step outside the safe interior of their trucks and be exposed to all the potential hazards of a hold-up. Further, once the exposed guards are held at bay or put out of action by hold-up men, there is nothing to prevent the latter from wheeling the safe to a near-by getaway vehicle and open the safe unmolested elsewhere.

It is a primary object of the present invention to provide for armored-truck money transport to the front or any other accessible parking place outside any bank establishment, and for delivery of money from the parked truck by guard personnel thereof to the inside of the establishment through a public entrance, while at all times, including in the course of an actual hold-up attempt, shielding the delivering personnel from any and all hazards of a hold-up and permitting unmolested delivery of the money inside the establishment as assuredly as though there were no hold-up. Thus, with this arrangement, utmost personal safety of truck guards from the hazards of hold-ups is combined with utmost reliability of money delivery inside any bank or other establishment.

It is another object of the present invention to attain the aforementioned personal safety of truck guards from the hazards of hold-ups combined with reliability of money delivery inside a bank establishment, by providing two associated armored trucks, of which one is a main truck and the other is a wheeled satellite of the main truck and normally carried by the latter except for delivery of money from the parked main truck outside a bank establishment to the inside of the latter. To this end, the satellite truck is a miniature version of an armored truck, being sufficiently small to pass through an average public entrance to a bank establishment and be conveniently carried by the armored main truck without undue, if any, increase in the size of the latter beyond the accustomed size of an armored money-transporting truck, yet being sufficiently large to hold preferably a single truck guard comfortably and completely shielded from the outside and be provided with a steering mechanism and a power plant for propulsion.

Further objects and advantageous will appear to those skilled in the art from the following, considered in conjunction with the accompanying drawings.

In the accompanying drawings, in which certain modes of carrying out the present invention are shown for illustrative purposes:

FIG. 1 is a perspective view of associated main and satellite trucks embodying the invention;

FIG. 2 is a rear view of the main truck with the satellite truck removed;

FIG. 3 is a side view of the satellite truck;

FIG. 4 is a fragmentary perspective view of associated main and satellite trucks embodying the invention in a modified manner;

FIG. 5 is a rear view of associated main and satellite trucks embodying the invention in a further modified manner; and FIG. 6 is a fragmentary perspective view of a street scene depicting money delivery in an armored satellite truck from a parked armored main truck to the interior of a bank in this instance, with the satellite truck being driven by an armed guard therein over the sidewalk next to the bank and amidst exemplary pedestrian traffic thereon.

Referring to the drawings, and more particularly to FIGS. 1 and 2 thereof, the reference numeral 10 designates an armored truck for transporting money and other valuables to commercial establishments such as banks, for example. The truck has an armored body 12 which is divided into driver and load compartments 14 and 16 the interiors of which may be in communication through a passage or door (not shown). For mobility, the truck has front and rear wheels, and for propulsion is equipped with an engine under a hood 18 and a steering mechanism with a steering wheel in the driver compartment 14. The driver compartment 14 is provided with at least one armored door 20 for use by the personnel assigned to the truck, usually at least two armed guards of which one is also the driver. The load compartment 16 may be provided with a similar armored door 22 and with suitable bullet-proof windows 24, with the doors 20, 22 and windows 24 being preferably provided with turrets 28 through which the guards may fire their arms from the safe interior of the truck in case of a hold-up. The armored truck described so far may be conventional in most respects.

In accordance with an important aspect of the invention, there is provided a vehicle 30 which, while not having the characteristic appearance of an armored truck like the described truck 10, for example, nevertheless functions as an armored truck, but as a satellite of the "main" truck 10. Thus, the truck 30 is a satellite of the truck 10 by being carried on the latter except when used for transfer of money or other valuables from the main truck outside a bank to the interior thereof. In order to be thus carried on the main truck and also for other reasons to be explained, the satellite truck 30 is of considerably smaller size than the main truck 10. For carrying the satellite truck 30, the main truck 10 is provided with a platform 32 which extends rearwardly from the load compartment 16 of the main truck. The main truck 10 further provides means for loading the satellite truck 30 onto and unloading it from the platform 32, with the loading and unloading means being in this instance a ramp 34 which at 36 is hinged to the platform 32 so that it can be lowered onto the ground (FIG. 1) or raised from the ground into an upright position in which it may be locked by a suitable latch 38 (FIG. 2).

The satellite truck 30 has an armored body 40 on front and rear wheels 42 and 44 (FIGS. 1 and 3), a steering mechanism for the front wheels 42, including a steering wheel 46 in the protected interior of the body 40, and a power drive for the front or rear wheels 42 or 44, including any suitable power plant 48 in the interior of the body 40 (FIG. 3). For low cost, as well as for rather inconspicuous appearance as a truck, the body 40 is preferably in the form of a simple rectangular block which also blends rather nicely with the body of the main truck when carried on the platform 32 thereof (FIG. 1). The satellite truck 30 is preferably provided in the front 50 and rear 52 and also on one side 54 with bullet-proof windows 56 which are exposed when the satellite truck is carried by the main truck, so that a guard in the protected interior of the satellite truck may fire his arm through turrets 58 in these windows in the event of a hold-up.

As already mentioned, the satellite 30 is of considerably smaller size than the main truck 10 so that the satellite truck may not only be carried by the latter without unduly adding to the size and bulk of the main truck, but even more important, may pass through public entrances to most bank establishments. Moreover, while the satellite truck 30 is of relatively small size for the considerations mentioned, its protected interior is nevertheless sufficiently large to hold an armed guard with enough freedom of movement to drive the satellite truck and attend to other chores therein, including defending the truck in case of a hold-up.

In order that the protected interior of the main truck may be in safe communication with the interior of the satellite truck when the latter is carried on the main truck, the main truck has in the rear of its load compartment an armored door 64 which opens inwardly (FIG. 2), with this door 64 being opposite a similar, inwardly opening, armored door 66 (FIG. 3) in the side of the satellite truck 30 next to the main truck 10 when the satellite truck is carried by the main truck. Thus, with the satellite truck 30 carried on the rear platform 32 on the main truck with its door opposite the door 64 in the load compartment 16 of the main truck, and with the satellite truck being further in designated near abutment with the load compartment of the main truck as shown in FIG. 1, the doors 64 and 66 may be opened for entry into the interior of the satellite truck from the load compartment of the main truck and for transfer of money and/or other valuables from the main truck to the satellite truck for delivery by the latter at the bank or other establishment at which the main truck is scheduled to stop next. While the satellite truck is thus carried on the main truck 10 en route of the latter from bank to bank, the ramp 34 is, of course, locked in its upright position by the latch 38 (FIG. 2). Preferably, the latch 38 is of any suitable type which can be actuated into ramp locking and release positions from the protected interior of the load compartment of the main truck. Also, and to the same end of not requiring exposure of any truck guard for the task of lowering and raising the ramp 34, there is provided a flexible cable 68 which at 70 is attached to the ramp and passes through an aperture 72 in the load compartment 16 to the interior thereof where it may safely be handled by a truck guard.

In use of the satellite truck 30, the same is serviced, i.e., loaded with money and/or other valuables for delivery at the next bank establishment, conveniently while the main truck 10 is en route to that establishment and carries the satellite truck. A truck guard who is to deliver the money and/or other valuables in the satellite truck will enter the latter before or as the main ruck arrives at the scheduled bank establishment and is parked at a convenient place outside the establishment. A guard inside the main truck next actuates the latch 38 into releasing position and handles the cable 68 to let the ramp 34 down onto the ground, whereupon the guard inside the satellite truck drives the same down the ramp and into and through the nearest public entrance to the bank establishment into the interior thereof where the delivery may safely take place through the truck's front window 56, for example, when the guard opens the same by lowering it, for example. While the satellite truck is on its way to the interior of the bank establishment and still outside the latter, the satellite truck is under effective fire protection of the guard therein and of the remaining guard or guards in the interior of the main truck, with the satellite truck being safe from a hold up once the same is in the interior of the bank establishment. The satellite 30 also lends itself to night delivery of money and other valuables in night depositories accessible from the outside of those bank establishments which have them. For such night delivery, the satellite truck is driven to the outside depository, whereupon the guard in this truck may open the front window 56 and deposit the money and/or other valuables.

With the satellite truck being provided with wheels, the same is adapted for riding mostly on level ground and to some extent over stairs which are quite low, though caterpillar treads are clearly indicated for satellite trucks which are called upon to negotiate stairs that are not so low.

While the satellite truck is rather exposed to view when carried by the main truck 10 (FIG. 1), the modified main truck 10a of FIG. 4 has a compartment 80 behind and next to the load compartment 16a for carrying a satellite truck well hidden from view, with the compartment 80 being normally closed by a ramp 34a in its upright position in which it is releasably locked by a latch 38a. The ramp 34a can be lowered onto the ground as shown in FIG. 4 so that a satellite truck may ride over it when leaving the compartment 80. The latch 38a is actuated into its ramp locking and release positions preferably from the protected interior of the load compartment 16a of the main truck, and the ramp 34a is lowered onto and raised from the ground by a plunger 82 in a double-acting cylinder 84 which is preferably actuated also from the protected interior of the load compartment 16a of the main truck. The load compartment 16a and the compartment 80 are preferably separated from each other by an armored partition 86 with an armored door 88 so that the compartment 80 can effectively be sealed off from the protected interior of the load compartment 16a when the satellite truck departs from the compartment 80 and until the same returns to this compartment.

FIG. 6 shows the main truck 10a of FIG. 4 parked next to a public walkway or sidewalk 100 along the bank B to which money from the main truck 10a is to be delivered in the satellite truck 30a. This satellite truck 30a is shown driven by an armed guard therein over the sidewalk 100 and in this instance through a public entrance E to the safe interior of the bank where the money is delivered. FIG. 6 also indicates that the transfer of money from the main truck 10a to the bank B in the satellite truck takes place while the latter is driven by an armed guard therein over the sidewalk 100 in the midst of any pedestrian traffic thereon which in this instance involves a few pedestrians P.

Reference is now had to FIG. 5 which shows a further modified main truck 10b which in lieu of a fixed platform has an elevator platform 90 for carrying as well as loading and unloading a satellite truck 30b, with the elevator platform 90 having a power elevator mechanism which is preferably actuated from the protected interior of the main truck, and includes lift prongs 92 on the bottom side of the elevator platform 90. Thus, the elevator mechanism may be operated to lower and raise the prongs 92 and platform 90 thereon to and from the ground.

What is claimed is:

1. Method of delivering money or the like to a bank in separately motorized and steerable armored main and satellite trucks of which the satellite truck is of sufficiently small size to pass through the hereinafter mentioned pedestrian entrance to the bank, comprising driving the main truck on designated public driveways to the bank and parking it next to a pedestrian walkway outside the bank while carrying the satellite truck on the main truck; placing money into the satellite truck; stationing a person in the protected interior of the satellite truck while the same is carried by the main truck; while the main truck is parked outside the bank, lowering the satellite truck onto the ground for driving thereon; and for delivery of the money in the satellite truck to the bank, driving and steering the lowered satellite truck by the person therein on the pedestrian walkway in any pedestrian traffic thereon and through a pedestrian entrance into the interior of the bank or to a depository located along the pedestrian walkway outside the bank.

* * * * *